(12) United States Patent
Zakai et al.

(10) Patent No.: US 6,415,372 B1
(45) Date of Patent: Jul. 2, 2002

(54) ROLLING BACK STORAGE SUBSYSTEM RECONFIGURATIONS

(75) Inventors: Avinoam Zakai, Haifa; Shai Bar-Nefy, Ramat Hasharon, both of (IL); David Wayne DesRoches, Methuen, MA (US); Tao Kai Lam, Boston, MA (US); Ruben Michel, Hopkinton, MA (US)

(73) Assignee: EMC Coropration, Hopkinton, MA (US)

( * ) Notice: Subject to any disclaimer, the term of this patent is extended or adjusted under 35 U.S.C. 154(b) by 0 days.

(21) Appl. No.: 09/442,884

(22) Filed: Nov. 19, 1999

Related U.S. Application Data

(63) Continuation-in-part of application No. 09/396,146, filed on Sep. 15, 1999.

(51) Int. Cl.⁷ .............................. G06F 12/02; G06F 9/00
(52) U.S. Cl. ........................ 711/165; 711/170; 711/114; 709/105
(58) Field of Search ................................. 711/170, 4, 5, 711/111, 112, 114, 165; 709/105

(56) References Cited

U.S. PATENT DOCUMENTS

| | | | | |
|---|---|---|---|---|
| 5,701,429 A | * | 12/1997 | Legvold et al. | 711/114 |
| 5,950,218 A | * | 9/1999 | Howard | 711/4 |
| 6,061,761 A | * | 5/2000 | Bachmat | 711/114 |
| 6,088,766 A | | 7/2000 | Bachmat et al. | |
| 6,112,257 A | * | 8/2000 | Mason et al. | 709/105 |
| 6,189,071 B1 | | 2/2001 | Bachmat | |
| 6,209,059 B1 | * | 3/2001 | Ofer et al. | 711/114 |
| 6,237,063 B1 | | 5/2001 | Bachmat | |
| 6,341,333 B1 | * | 1/2002 | Schreiber et al. | 709/105 |

* cited by examiner

Primary Examiner—Matthew Kim
Assistant Examiner—B. R. Peugh
(74) Attorney, Agent, or Firm—Gary A. Walpert; John M. Gunther; Penelope S. Wilson

(57) ABSTRACT

A method and an apparatus for reconfiguring a storage subsystem by performing an ordered sequence of reconfigurations of physical storage volumes of the storage subsystem. The method and apparatus perform a portion of the sequence of reconfigurations, in response to receiving a rollback request, in an order that is reversed with respect to the order of the sequence.

20 Claims, 14 Drawing Sheets

Table of historical data on Workloads — 46

| Vol. ID | A | B | C | D | E | F | ... | Exclude |
|---|---|---|---|---|---|---|---|---|
| 1 | 10 | 7 | 7 | 9 | 0 | 7 | ... | N |
| 2 | 9 | 6 | 3 | 5 | 0 | 6 | ... | N |
| 3 | 4 | 9 | 11 | 5 | 0 | 4 | ... | N |
|   | 11 | 2 | 12 | 7 | 6 | 5 | ... | Y |
| ⋮ |   |   |   |   |   |   |   | ⋮ |
| N | 9 | 3 | 13 | 6 | 5 | 8 |   | Y |

48 { rows }, 47 { columns }, 49

Swap Priorities

| VOL.→ | A | B | C | D | E | F | ... |
|---|---|---|---|---|---|---|---|
|  | Prefer | Prefer | Prefer | Enable | Enable | Prefer | ... |

50

| MAILBOX | |
|---|---|
| Header | 87 |
| Enabled/Disabled | 72 |
| Sampling Frequency | 73 |
| Number of Samples Stored | 74 |
| Number of Samples per Algorithm cycle | 75 |
| Sample exclusion time zones | 76 |
| Swap exclusion time zones | 79 |
| Priorities of storage volumes | 78 |
| Run time limit of algorithm | 77 |

FIG. 7

SWAP LIST — 140

| TIME | SWAP PAIR | |
|---|---|---|
| $T_1$ | X↔Y | 141 |
| $T_2$ | Z↔B | 142 |
| $T_3$ | W↔Z | 143 |
| $T_4$ | K↔J | 144 |
| $T_5$ | L↔M | 145 |
| $T_6$ | E↔G | 146 |
| $T_7$ | Z↔W | 147 |
| $T_8$ | Z↔W | 148 |
| $T_9$ | E↔G | 149 |
| $T_{10}$ | D↔F | 150 |
| $T_{11}$ | A↔B | 151 |

ROLLING BACK STORAGE SUBSYSTEM RECONFIGURATIONS

This is a continuation-in-part of U.S. application Ser. No. 09/396,146, titled "Mailbox For Controlling Storage Subsystem Reconfigurations", filed Sep. 15, 1999 by Avinoam Zakai et al.

BACKGROUND OF THE INVENTION

The invention relates to data storage of a distributed storage subsystems.

Enterprises often have storage subsystems that use large arrays of physical storage devices to provide shared data storage for host devices. Typically, the host devices are isolated so that they are unaware of the complete physical layout of data storage of the storage subsystem. Instead, the host devices know the logical layout of data storage.

By isolating host devices from the physical layout of the storage subsystem, host applications become more portable. The host applications can execute on host devices using storage subsystems having different physical layouts. But, such host devices are also unaware of the workloads of the individual physical storage devices.

Since the host devices do not know the workloads of physical storage devices, they cannot change their storage usage patterns to compensate for overloading particular physical storage devices. Overloading a physical storage device can cause the device's physical drives to operate slowly. Slow physical drives lead to long access times and degraded performance of the host applications that use the storage device.

SUMMARY OF THE INVENTION

Various embodiments provide apparatus and methods for rolling back a configuration of a storage subsystem to an earlier configuration. Rolling back configurations can help system managers who wish to experiment with different storage configurations, e.g., to accommodate different usage patterns of the storage subsystem. A system manager may tentatively reconfigure the storage subsystem and still be able to roll back the subsystem to an earlier configuration if the new configuration does not improve performance.

In one aspect, the invention provides a method of reconfiguring a storage subsystem. The method includes performing a first ordered sequence of reconfigurations of physical volumes of the storage subsystem. The method includes then performing a portion of the reconfigurations in a second ordered sequence in response to receiving a rollback request. The order of the second sequence is reversed with respect to the order of the first sequence.

In another aspect, the invention provides a method of reconfiguring a storage subsystem. The method includes performing a series of swaps of physical storage volumes of the subsystem and recording each swap in a list in response to performing the swap. The method also includes reading a portion of the list and undoing a portion of the swaps read from the list.

In another aspect, the invention provides a data storage device storing a computer executable program of instructions for reconfiguring a storage subsystem. The instructions cause the computer to perform a series of swaps of physical storage volumes. The swaps have been previously performed in a reversed order.

In another aspect, the invention provides a data storage device storing a computer readable object. The object includes a list identifying swaps performed on pairs of physical storage volumes of a storage subsystem.

In another aspect, the invention provides an apparatus. The apparatus includes a storage subsystem having a plurality of physical storage volumes and a computer capable of reconfiguring the storage subsystem. The computer can reconfigure the system by swapping storage volumes and can roll back the storage subsystem to an earlier configuration.

BRIEF DESCRIPTION OF THE DRAWINGS

Other objects, features, and advantages of the invention will be apparent from the following description taken together with the drawings in which:

FIG. 4A illustrates a table that the service processor of FIGS. 1A, 1B and 3 uses to store historical data on workloads;

FIG. 4B illustrates a file that stores priority data on storage volumes;

FIG. 7 illustrates the mailbox assigned to the service processor shown in FIGS. 1A–1B;

FIG. 11 illustrates a file that lists swaps of physical storage volumes performed on the storage subsystem;

DESCRIPTION OF THE PREFERRED EMBODIMENTS

As used in this application, the workload of a storage device is defined to be the amount of work that the device performs as a result of data access requests. One measure of the workload is a total number of accesses. Another measure uses a weighted sum of the numbers of each type of access, e.g., reads, writes, and prefetches. The measure defining the workload thus can attach different weights to the various types of accesses.

Distributed Storage Subsystem

Figure 1A:
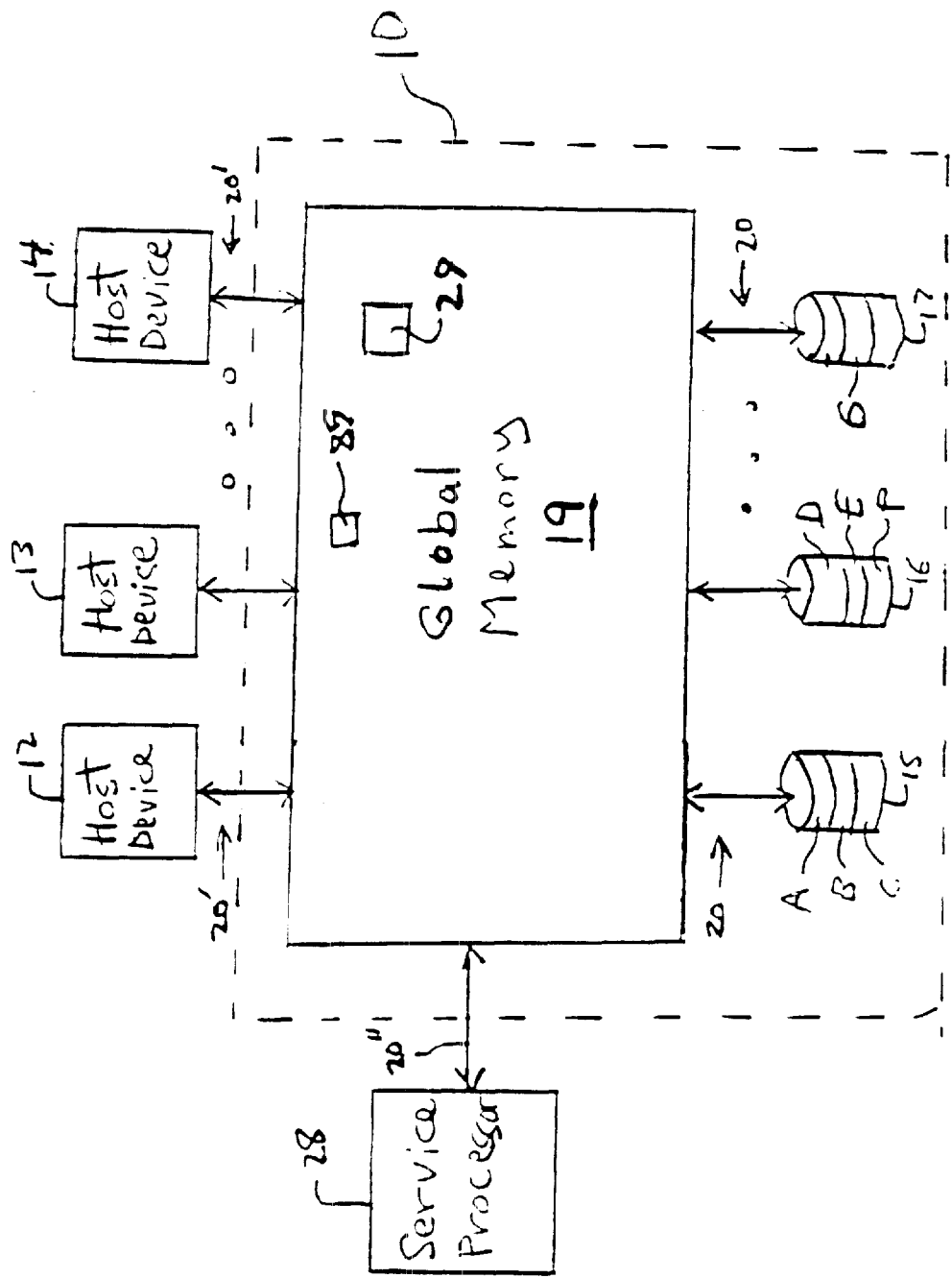
FIG. 1A is a block diagram of a storage subsystem providing shared data storage to a group of host devices.

FIG. 1A shows a storage subsystem 10 that provides shared data storage to a group of host devices 12–14. The shared data storage is located on physical storage devices 15–17, e.g., multiple disk devices, that are accessible to the host devices 12–14 through a global memory 19. The host devices 12–14 and storage devices 15–17 connect to the global memory 19 through channels 20' and 20, respectively, e.g., busses or networks.

Figure 1B:
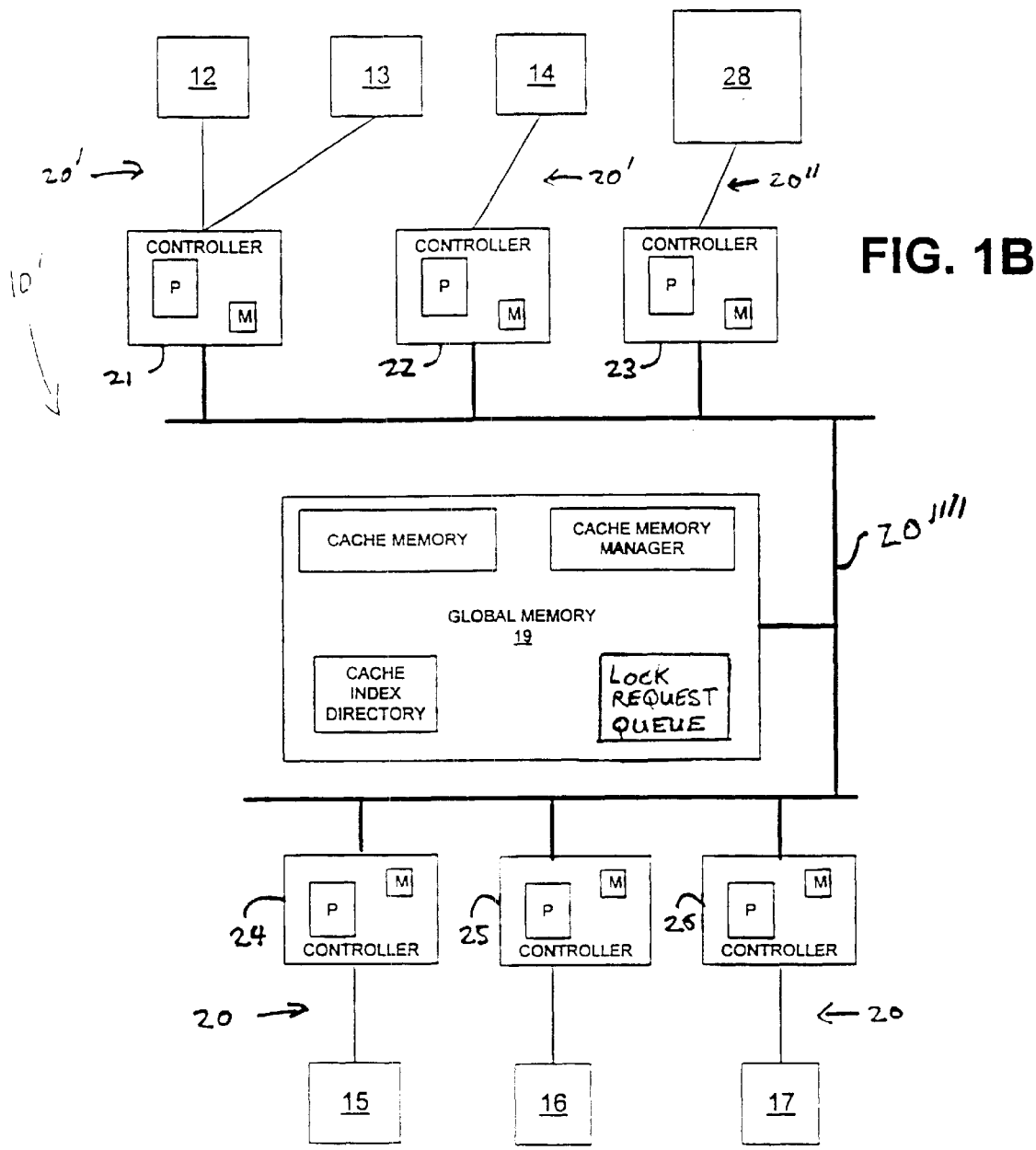
FIG. 1B is a diagram of one embodiment of the storage subsystem of FIG. 1A.

FIG. 1B shows an embodiment 10' of the storage subsystem 10 that uses several intelligent controllers 21–26. Each controller 21–26 manages communications between one or more devices 12–17 to the controller 21–26 and the remainder of the storage subsystem 10'. Each controller 21–26 includes a processor P and a local memory M. The local memory M stores executable software for communication protocols adapted to communicating with the particular devices 12–17 coupled to the controller 21–26.

The controllers 21–26 couple the devices 12–17 and service processor 28 to the global memory 19 through a collection of busses and/or a network 20".

The global memory 18 is a staging area for communications and data transfers between the host and storage devices 12–17. The locally coupled controller 21–26, first transfers data from the source device 12–17 to a cache memory located in the global memory 19. Then, the data is transferred from the cache memory to the destination device 12–17. The cache memory includes a cache memory manager for managing cache accesses and a cache index directory for identifying data stored in the cache.

Since several host controllers 21–23 may request access to the storage devices 12–14 simultaneously, the global memory 19 includes a lock. A requesting device 12–14 obtains the lock prior to accessing the storage devices 15–17 and relinquishes the lock after performing the desired accesses. Requests for the lock are stored in a lock request queue.

Referring again to FIG. 1A, the storage devices 15–17 physically divide into separate storage volumes, A–G. The storage volumes A–G may either be disk partitions identified by device, head, and cylinder identifiers or smaller regions of the physical storage devices 15–17. The distribution of data over the physical storage volumes A–G is at least partially hidden from the host devices 12–14, because the host devices 12–14 see the storage subsystem 10 as a collection of logical volumes. Since the host devices 12–14 do not see the underlying physical layout, the physical distribution of data in the storage subsystem 10 may be changed transparently to the host devices 12–14. One way of changing the distribution of data involves performing a series of swaps between pairs of the physical storage volumes A–G.

Figure 2:
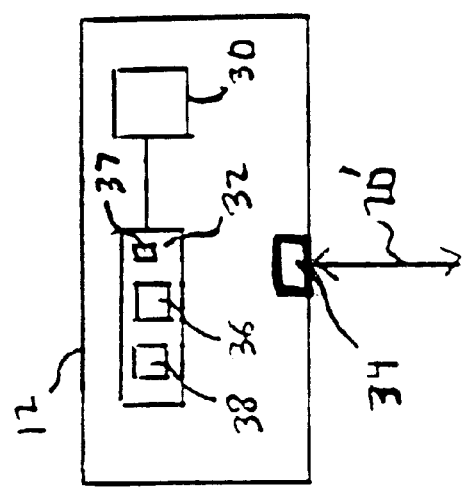
FIG. 2 is a block diagram of one of the host devices shown in FIGS. 1A–1B.

FIG. 2 is a block diagram of one of the host devices 12–14 shown in FIGS. 1A–1B, i.e., host device 12. The host device 12 is a personal computer that has a microprocessor 30, a data storage device 32, such as a random access memory (RAM), and/or mass storage such as a magnetic or optical disk, and an I/O interface 34. The data storage device 32 stores application programs 36, 37 and a communication program 38 that can be executed by the microprocessor 30. The application programs 36, 37 communicate with the storage subsystem 10 through the communication program 38. The communication program 38 also generates a GUI that enables a user to control communications interactively.

Referring again to FIG. 1A, a service processor 28 couples to the global memory 19 through a bus 20" and the controller 23. The global memory 19 stores a mailbox 29 for the service processor 28 at a fixed and known address. The mailbox 29 can receive and store data from the host devices 12–14. Subsequently, the stored data can be read from the mailbox 29 by the service processor 28. The mailbox 29 provides file locations for direct communication between the host devices 12–14 and the service processor 28. The service processor 28 may read its mailbox 29 frequently, e.g., every minute.

Figure 3:
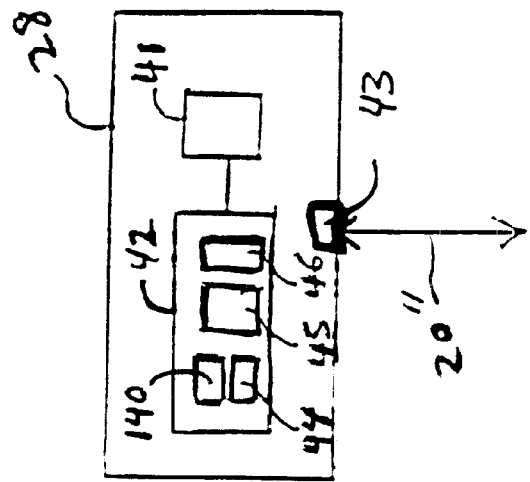
FIG. 3 is a block diagram of the service processor shown in FIGs. 1A–1B.

FIG. 3 is a block diagram illustrating the service processor 28 of FIG. 1A. The service process is a programmed computer, e.g., a laptop, that has a microprocessor 41, a data storage device 42, e.g., a RAM, a hard drive, and/or a mass storage such as a magnetic or optical disk, and an interface 43. The data storage device 42 stores a software program 44 for balancing workloads, a communication program 45, a table 46 storing historical workload data, and a swap list file 140 for use in rollbacks. The programs 44, 45 are executable by the microprocessor 41. The program 44 for balancing workloads generates a GUI that enables interactive user control while balancing workloads of the storage devices 15–17. The program 44 communicates with the storage subsystem 10 through the communication program 45.

In some embodiments, the programs 44, 45, table 46 and file 140 may be stored on different physical devices (not shown).

FIG. 4A illustrates the table 46 of FIG. 3, which stores historical data on the workloads of the storage volumes A–G. The table 46 is a matrix having columns 47 that identify individual storage volumes A–G and rows 48 that identify time slices over which the workload data has been collected. Each entry is a counter value indicating a total workload, e.g., number of data accesses to the associated physical storage volume A–G. In some embodiments, the entries give separate counter values for the numbers of reads, writes and prefetches to the associated storage volume A–G.

Several properties of the table 46 are controlled by parameter values read from the service processor's mailbox 29. One such parameter determines the total number N of rows 48 in the table 46, i.e., the maximum number of time slices of stored workload data. Other such parameters, listed in column 49, determine whether to exclude data in selected rows 48 of the table 46 from use in the algorithms that select the data swaps used to better balance workloads of the storage devices 15–17.

Referring to FIG. 4B, other control parameters fix swap priorities for each individual storage volume A–G. The service processor 28 stores the values of the swap priorities in a file 50. The service processor 28 updates the swap priorities in the file 50 by reading new values of the priorities from the mailbox 29.

In one embodiment, the swap priority for a storage volume A–G can have one of three values, i.e., enabled, disabled, and preferred. The value "disabled" stops the service processor 28 from swapping data in the associated storage volume A–G. The value "enabled" allows the service processor 28 to swap data in the associated storage volume A–G. The value "preferred" makes the service processor 28 swap the associated storage volume A–G before swapping storage volumes having the value "enabled" as explained in more detail below. The "preferred" priority may be assigned to those storage volumes A–G requiring fast accesses.

Balancing Workloads

The service processor 28 balances workloads of the storage devices 15–17 based on historical data detailing the workload, e.g., by numbers of data accesses. The host devices 12–14 can adjust the balancing process. The host devices 12–14 can change the values of the control parameters for the process by writing new values to the service processor's mailbox 29.

Figure 5A:
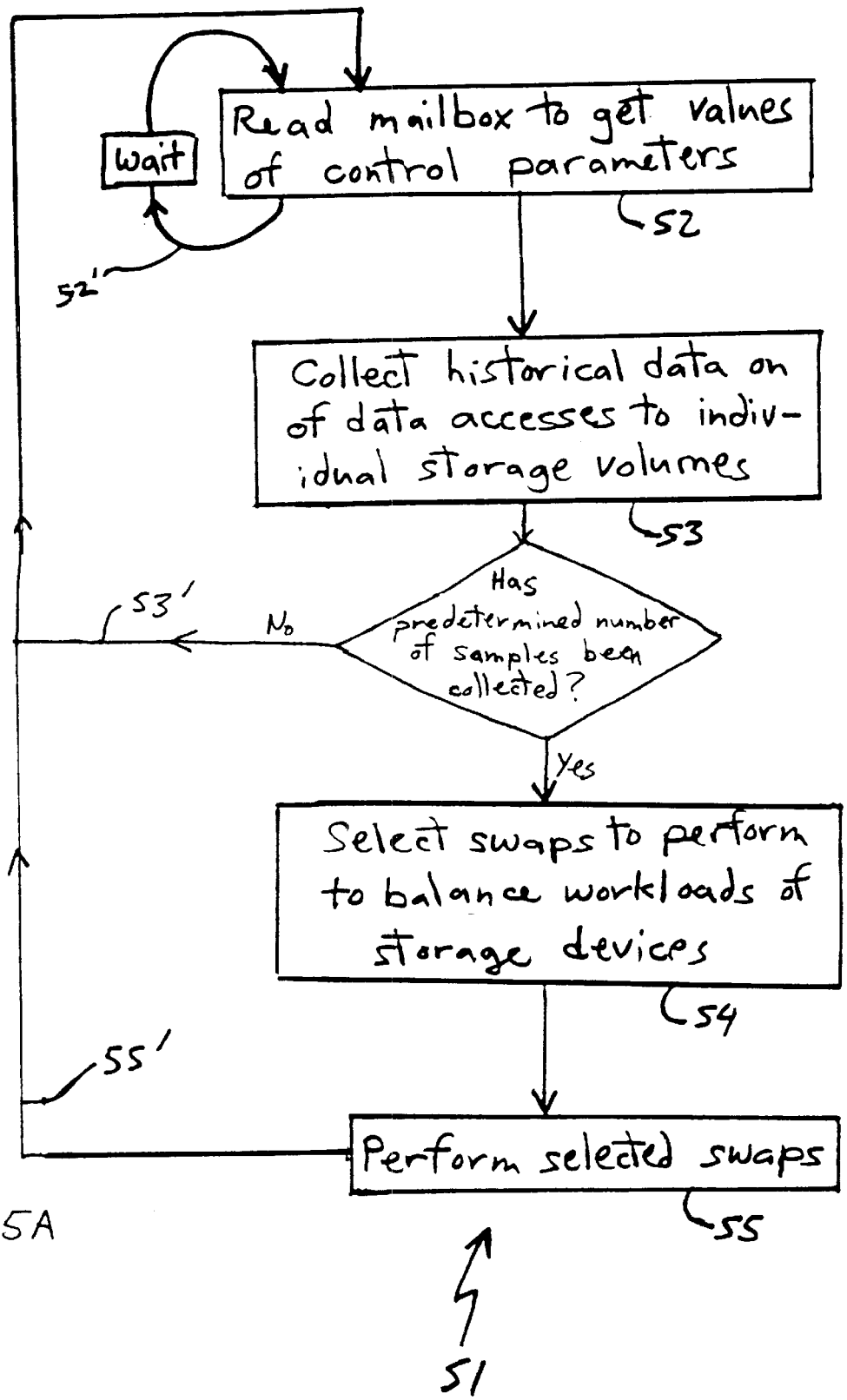
FIG. 5A is a flow chart illustrating a cyclic method of balancing workloads of the storage devices shown in FIGS. 1A–1B.

FIG. 5A is a flow chart illustrating a cyclic method 51 used by the service processor 28 to better balance workloads of the storage devices 15–17. To start a new balancing cycle, the service processor 28 reads its mailbox 29 to get new values, if any, of parameters that control the balancing process (step 52). Then, the service processor 28 collects samples of historical data (step 53). The samples describe the workload, e.g., number of data accesses, to each physical storage volume A–G of the storage subsystem 10 during a time slice. The collected historical data is stored in the internal table 46 shown in FIGS. 3 and 4A.

After collecting each sample, the service processor 28 loops back (53') to step 52 to start the collection cycle for the next sequential time slice by rereading the mailbox 29. The loop back frequency is controlled by a control parameter obtained from the mailbox 29. The default frequency is once every fifteen minutes.

After collecting a predetermined number of samples, the service processor 28 selects data swaps that will lead to better-balanced workloads for the storage devices 15–17 (step 54). The predetermined number of samples is fixed by another control parameter from the mailbox 29.

The swap selections are based on predictions that assume that future workloads will track trends described by the historical data. One algorithm selects data swaps that would have produce more balanced workloads when averaged over the period of the historical workload data provided that the swaps had been performed earlier.

The selected data swaps are performed to implement balancing (step 55). After performing the swaps, the service processor 28 performs loop 55' to restart the balancing process.

The service processor 28 regularly rereads the mailbox 29. After each read, the service processor performs loop 52' waiting a preselected time and then rereading the mailbox 29. Parameters from each read are used to re-initialize control parameters stored in the service processor 28 for controlling workload balancing. The frequent rereads of the mailbox 29 keep the method 51 updated with respect to changes in the control parameters.

As an example of the timing of loops 52', 53', and 55', the service processor 28 may perform loop 52' every minute, perform loop 53' every fifteen minutes, and perform loop 55' to rebalance only once per day. But, the length of each loop 52', 53', 55' can differ substantially.

Figure 5B:
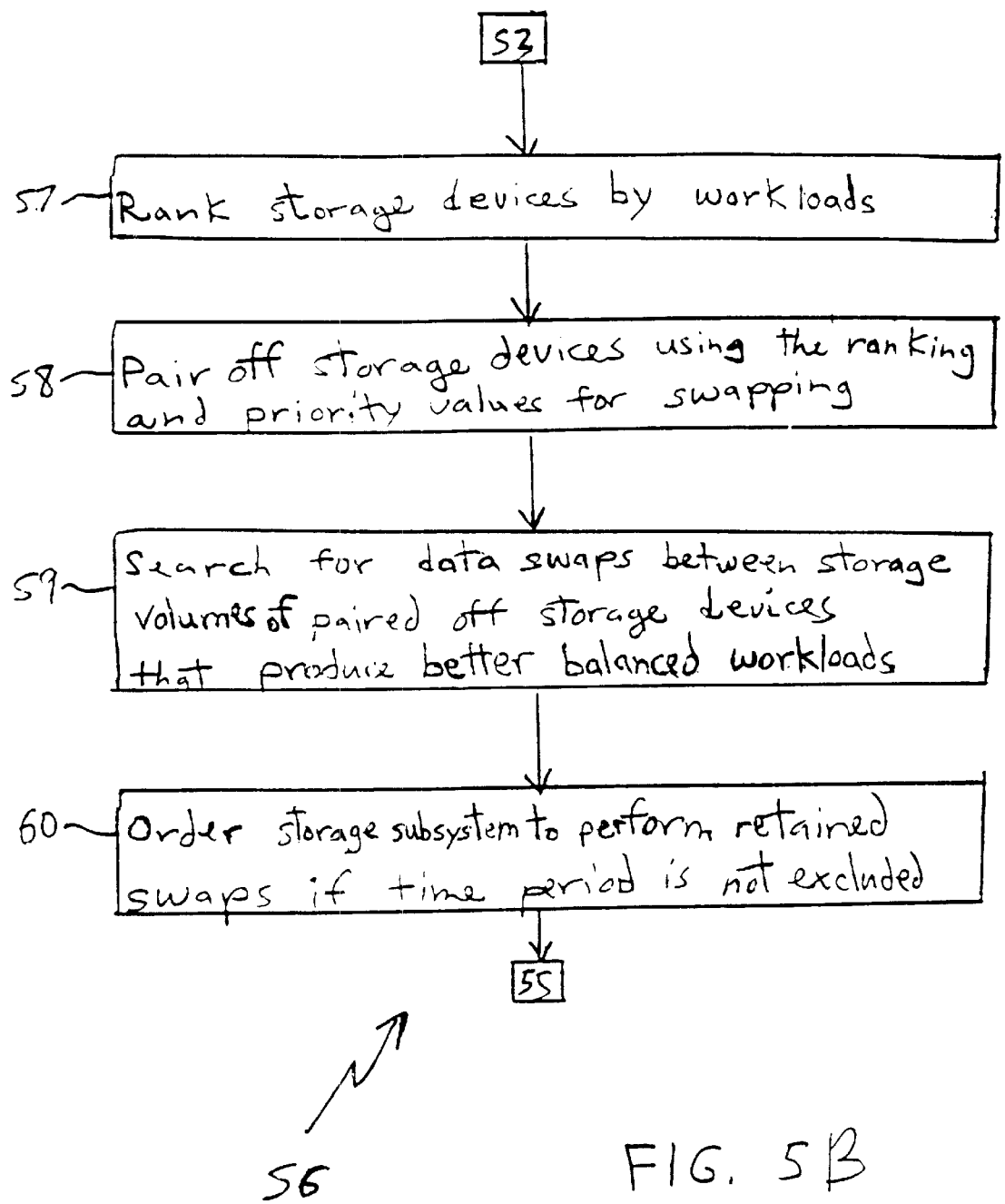
FIG. 5B is a flow chart illustrating a method of selecting data swaps that better balance workloads.

FIG. 5B is a more detailed flow chart for a method 56 of selecting the data swaps that balance workloads as described in step 54 of FIG. 5A. To start the selection of data swaps, the service processor 28 ranks the storage devices 15–17 according to workloads (step 57). The ranking is based on the non-excluded historical data from the table 46. After performing the ranking, the service processor 28 pairs off the storage devices 15–17 (step 58). The storage devices 15–17 having the heaviest workloads are paired off with the storage devices 15–17 with the lightest workloads.

For each identified pair of storage devices 15–17, the service processor 28 searches for swaps of physical storage volumes A–G that produce better balanced workloads (step 59). A swap must reduce historical imbalances of workloads for the paired storage devices 15–17 by more than predetermined threshold amount, e.g., ten percent, to be retained. Two storage volumes A–G must have the same size and emulation characteristics to qualify as potentially swappable. The service processor 28 then orders the storage subsystem 10 to perform the retained swaps (step 60). The retained swaps are performed, at step 60, provided that the swaps are not time excluded by control parameters.

Data availability will not be compromised by the swaps. The service processor 28 makes a check to determine whether performing the swap will impact data availability. Availability is less affected if the storage subsystem 10 has multiple copies of the data to be swapped, e.g., in a redundant array of inexpensive disks (RAID). If multiple copies exist, the swap of a storage volume A–G holding one copy does not reduce the overall availability of the data. If swapping compromises data availability, the swap is not performed at step 60.

To implement priorities stored in file 50, shown in FIG. 4B, the service processor 28 searches for swaps of storage volumes A–G, in two stages, for each pair of storage devices 15–17. First, the service processor 28 searches for swaps of storage volumes A–G of a pair of devices 15–17 in which at least one volume A–G of the pair has the "preferred" priority value. Second, the service processor 28 searches for additional swaps between the remaining storage volume A–G pairs that will better balance the pair. The additional swaps are between storage volumes A–G having the "enabled" priority value.

Referring again to FIG. 4A, the data of the table 46 will be used to illustrate one method for selecting data swaps in steps 57–59 of FIG. 5B.

At step 57, the service processor 28 uses a method that ranks the storage devices 15–17 based on average workload per non-excluded time slice. Non-excluded time slices correspond to rows 1–3 of exemplary table 46 as is seen from the column 49. During the non-excluded time slices, table 46 shows that the storage devices 15 and 16 had 66 and 36 accesses, respectively. During the same period, the storage device 17 had 54 accesses (not shown in FIG. 4A). From the numbers of accesses, the average workloads of the storage devices 15, 16, and 17 are 22, 12, and 18 accesses per time slice, respectively. Thus, the service processor 28 will rank the respective storage devices 15, 16, and 17 as most busy, least busy, and second most busy, respectively.

At step 58, the service processor 28 pairs off the most and least busy of the storage devices 15–17. Thus, the service processor 28 pairs storage devices 15 and 16 and determines that the storage device 17 will not participate in data swaps.

At step 59, the service processor 28 uses a search methodology to select data swaps that decrease workload imbalances by more than a threshold amount. Since the imbalance between the storage devices 15 and 16 is ten accesses per time slice, only data swaps that reduce the imbalance by at least 2.5 accesses per time slice can be selected if the threshold is 25%. Swapping the data of storage volume A with storage volume D or E will reduce the imbalance between storage devices 15 and 16 by 1.33 and 2 accesses per time slice, respectively. Both reductions are too small for the service processor 28 to select these data swaps. Swapping storage volumes A and E will reduce the imbalance between the storage devices 15 and 16 by 4.66 accesses per time slice, which is greater than the exemplary threshold of twenty-five percent. Thus, the service processor 28 will select the data swap between volume A and volume E at step 59.

After selecting the data swap between storage volumes A and E, the service processor 28 searches for other data swaps between the remaining storage volumes B, C and D, F. Any further selections of data swaps must further decrease the workload imbalance between the storage devices 15 and 16 by an above threshold amount. Swapping the storage volumes A and E makes the workload of the storage device 15 less than the workload of the storage device 16. Any other data swaps between the storage volumes B, C and the storage volumes D, F will increase the imbalance between the storage devices 15 and 16. Thus, the method 56 will only select to swap the storage volumes A and E for the workloads shown in FIG. 4A.

Figure 6A:
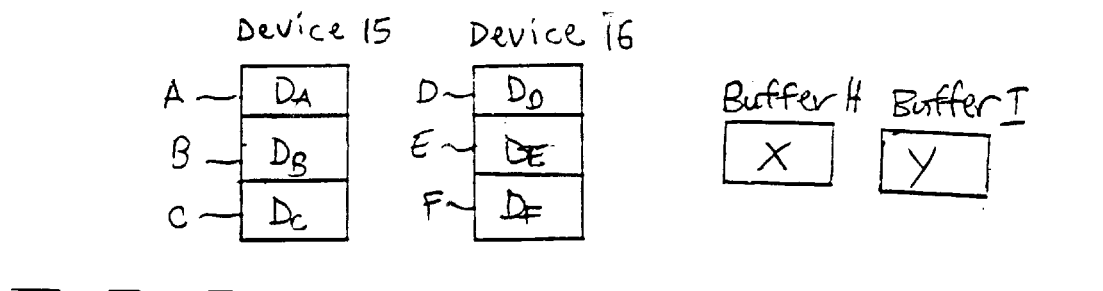
FIGS. 6A–6C are a time sequence illustrating a data swap between a pair of storage devices shown in FIGS. 1A–1B.
Figure 6B:
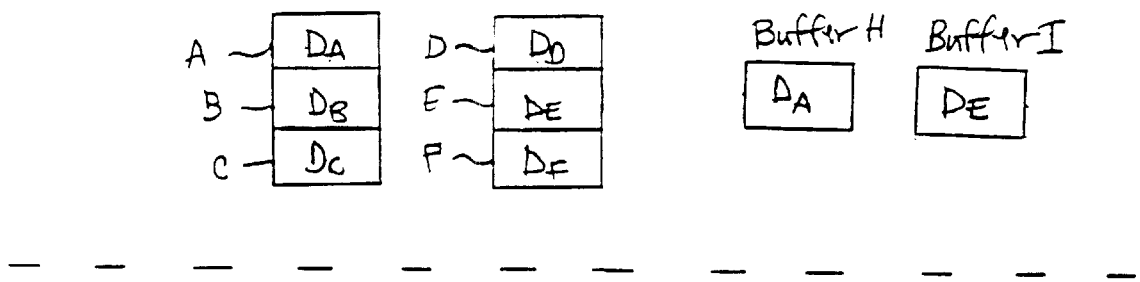
Figure 6C:
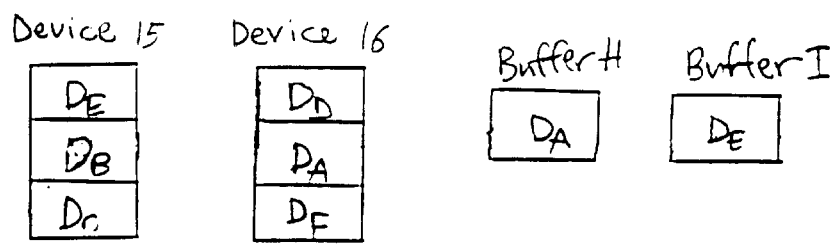

FIGS. 6A–6C illustrate a time sequence for making the above-selected data swap between storage volumes A and E of the storage devices 15 and 16. To swap data, the pair of physical storage volumes A and E should have the same size and store data in the same emulation, e.g., fixed-block versus count-key-data. The swap uses a pair of buffer storage regions H and I, which are large enough to store the data from the storage volumes A and E, respectively.

FIG. 6A shows the storage devices 15, 16 and buffers H, I prior to the swap. Storage volumes A–C and D–F contain data $D_A$–$D_C$ and $D_D$–$D_F$, respectively. The buffers H, I initially store old or nonsense data X, Y.

FIG. 6B shows the storage devices 15, 16 and buffers H, I after a parallel write of the data $D_A$ and $D_E$ from the storage volumes A, E to the buffers H, I. Now, the buffers H, I store the data $D_A$ and $D_E$ being swapped.

FIG. 6C shows the storage devices 15, 16 and buffers H, I after parallel writes of the data $D_A$ from buffer H and the data $D_E$ from buffer I back to the storage volumes E and A, respectively. The write back sends the data $D_A$ originally in the storage volume A to the storage volume E and the data $D_E$ originally in the storage volume E to the storage volume A completing the swap.

The service processor 28 also changes mapping information relating the physical storage volumes A, E, which store the data $D_A$, $D_E$ to logical identifiers. After changing the mapping information, the logical identifiers for $D_A$ point to the storage volume E and the logical identifiers for $D_E$ point to the storage volume A.

FIG. 7 illustrates the form of the mailbox 29 for the service processor 28 of FIG. 1A. The mailbox 29 stores control parameters 72–79 whose validity or invalidity is indicated in a header 87 area. The control parameters 72–79 can be overwritten by the host devices 15–17 to change details of the method 51, 56 of FIGS. 5A–5B.

One parameter 72 of the mailbox 29 acts like a switch for turning the method 50 on and off.

The parameters 73–74 control the collection of data on workloads, shown in step 53 of FIG. 5A. The parameter 73 defines the frequency at which the service processor 28 samples for new data on workloads of the storage volumes A–G. The parameter 74 defines the maximum number of time slices of workload data that the service processor 28 stores in the table 46 of FIG. 4A.

The parameters 75–77 control the method of selecting which storage volumes A–G to swap at step 54 of FIG. 5A. The parameter 75 defines the number of time slices of workload data collected between selection of the storage volumes A–G to swap. The parameter 76 indicates time slices of collected historical data that should be ignored when ranking the storage devices 15–17 and searching for swaps at steps 54 and 59 of FIGS. 5A and 5B. The parameter 76 enables users to set which workload data is to be used during swap selection. For example, a user may exclude weekends that are unlikely to be indicative of actual workloads on weekdays. The parameter 77 limits the run time for selecting storage volumes to swap. The run time limit enables users to cut off long determinations, which occur when swaps would only produce small improvements to load balancing.

Finally, the parameter 79 defines an exclusion time zone in which performing selected swaps is forbidden. The exclusion time zone does not affect the collection of historical data at step 53 of FIG. 5A.

The parameters 78 assign a value for a swapping priority to each physical storage volume A–G. As noted above, the three values of the priority are disabled, enabled, and preferred. A storage volume A–G with the "disabled" value cannot be swapped. Storage volumes A–G with either the "enabled" or the "preferred" values can be swapped. A storage volume A–G with the "preferred" value swaps preferentially over a storage volume A–G with the "enabled" value as was explained above in more detail.

Figure 8:
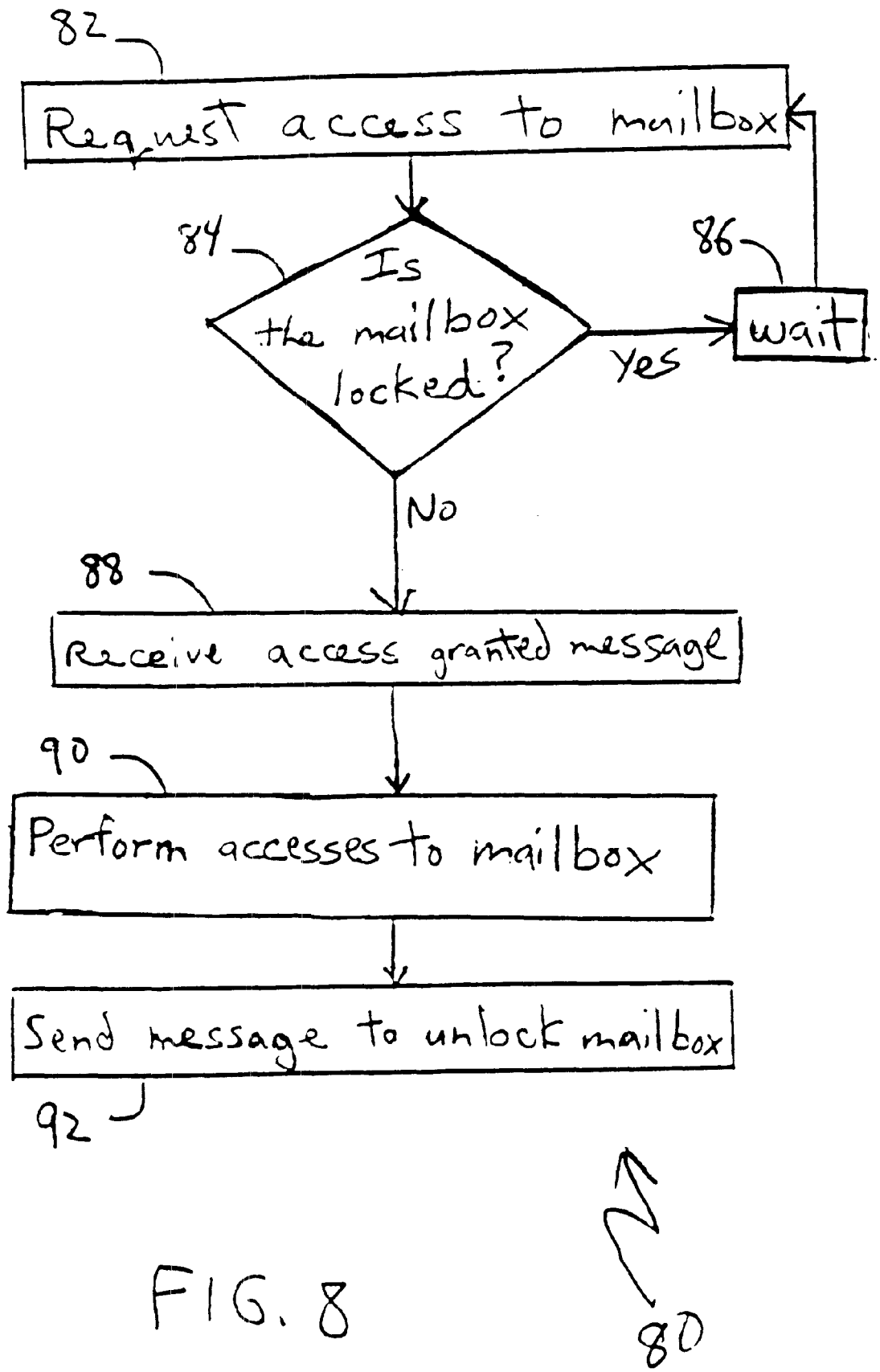
FIG. 8 is a flow chart illustrating a method of accessing the mailbox of the service processor.

FIG. 8 illustrates a method 80 by which a device, e.g., one of the host devices 12–14 or the service processor 28, accesses the service processor's mailbox 29. The device sends a message to the controller 18 requesting the right to access the mailbox 29 (step 82). If the mailbox 29 is locked, the device receives an "access denied" message from the controller (step 84). The device waits a preselected time to enable other devices to release the lock on the mailbox 29 before again requesting access (step 86).

Referring again to FIG. 7, the mailbox 29 is locked while any device has a right to access. The locked status is indicated by a flag entry stored at a known storage location 85 of the memory 19 of FIG. 1A. Only one device has the right of access to the mailbox 29 at one time so that consistency of the control parameters therein is assured. To release the locked status, the device granted the right of access must take an affirmative action.

Referring again to FIG. 8, the device receives an "access granted" message from the controller 18 if the mailbox 29 is not locked (step 88). After being granted access, the device accesses the mailbox 29 to read and/or write control parameters as desired (step 90). After completing the desired access or accesses, the device sends a message to the controller 18 to terminate its right of access to the mailbox 29, i.e., to unlock the mailbox 29 (step 92).

After being unlocked, other devices, e.g., the host devices 12–14, can access the mailbox 29. If new values of the control parameters are written to the mailbox 29, the new values affect the balancing of workloads after the service processor 28 again reads the mailbox 29.

Figure 9:
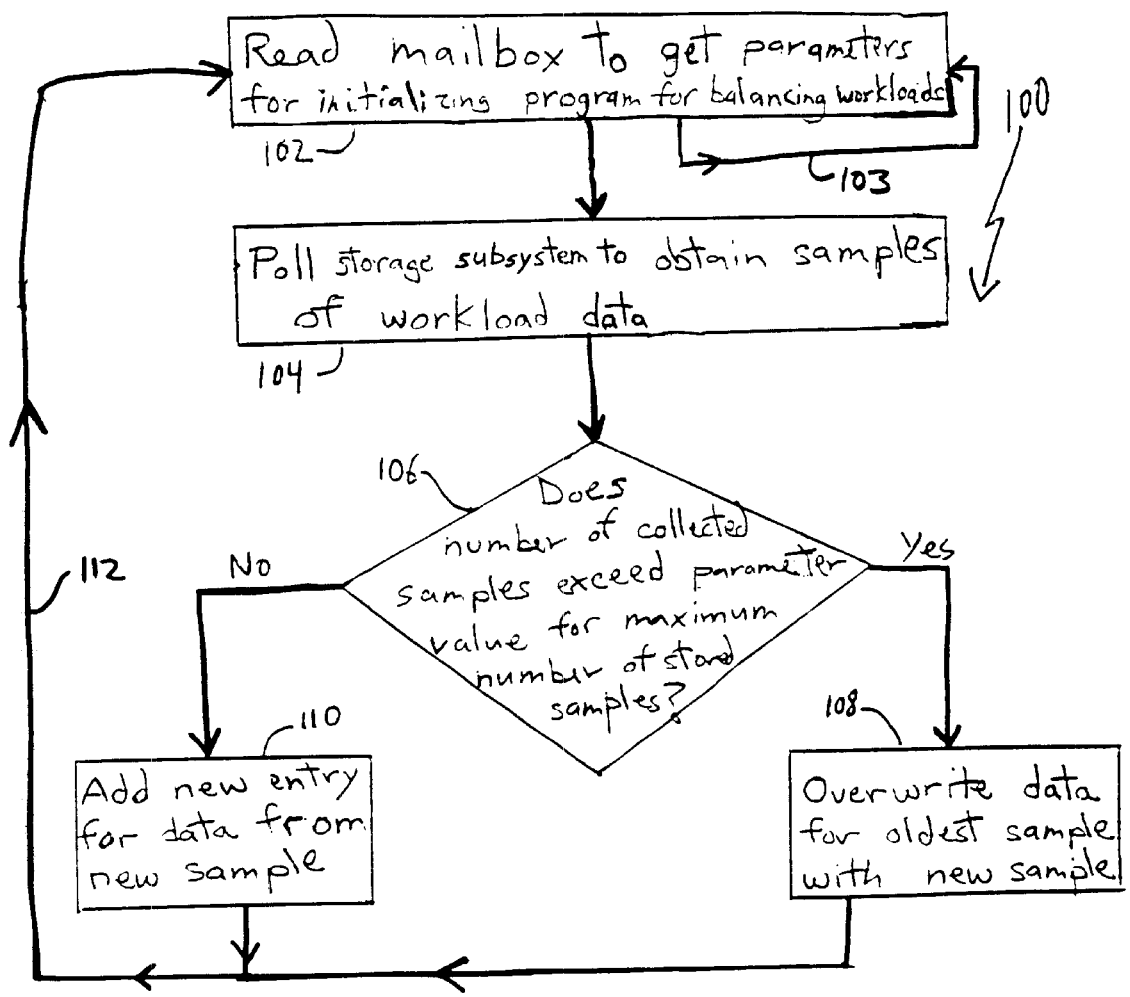
FIG. 9 is a flow chart illustrating a method of collecting historical data.

FIG. 9 is a flow chart illustrating one method 100 of collecting historical data on workloads at step 53 of FIG. 5A. The service processor 28 reads the mailbox 29 according to the method 80 of FIG. 8 to get parameters for initializing the program 44 for balancing workloads (step 102). The service processor 28 rereads the mailbox regularly, e.g., once per minute (loop 103). After getting initial values of the control parameters, the service processor 28 polls the storage subsystem 10 to obtain a sample of workload data for each physical storage volume A–G (step 104). Next, the service processor 28 checks whether the number of collected samples exceeds the value of the parameter 74, shown in FIG. 7, for the number of samples to store (step 106). The control parameter 74 fixes the maximum number of time slices for which samples are stored in the table of historical data on workloads 46, shown in FIG. 4A. If the number of time slices for collected samples exceeds the value of the parameter 74, the service processor 28 overwrites the sample in the table 46 for the oldest time slice with the new sample (step 108). Otherwise, the service processor 28 writes a new entry for the new sample in the table 46 (step 110).

After writing the new workload data in the table 46, the service processor 28 returns step 104 to reread the mailbox starting a new sampling cycle (loop 112). The service processor 28 polls for samples of workload data with a sampling frequency fixed by a control parameter read from the mailbox 29 at step 102. After a predetermined number of samples have been collected, the service processor 28 selects and performs swaps to better balance workloads, i.e., steps 54–55 of FIG. 5A.

Rolling Back Previously Performed Swaps

Herein, a reconfiguration refers to an exchange of two or more physical storage volumes having the same size and emulation. For example, a swap is a reconfiguration between two physical storage volumes. The configuration of the storage subsystem 10 of FIGS. 1A–1B is defined by the arrangement of the physical storage volumes A–G.

Occasionally, a series of swaps reconfigures the storage subsystem 10 in a way that may worsen performance. For example, performance may worsen if a performed swap is based on historical data that does not reflect future workload conditions. To correct such reconfiguration errors, the service processor 28 can rollback a series of previously performed swaps and return the storage subsystem 10 to an earlier configuration, i.e., the configuration at an earlier date and time.

Figure 10:
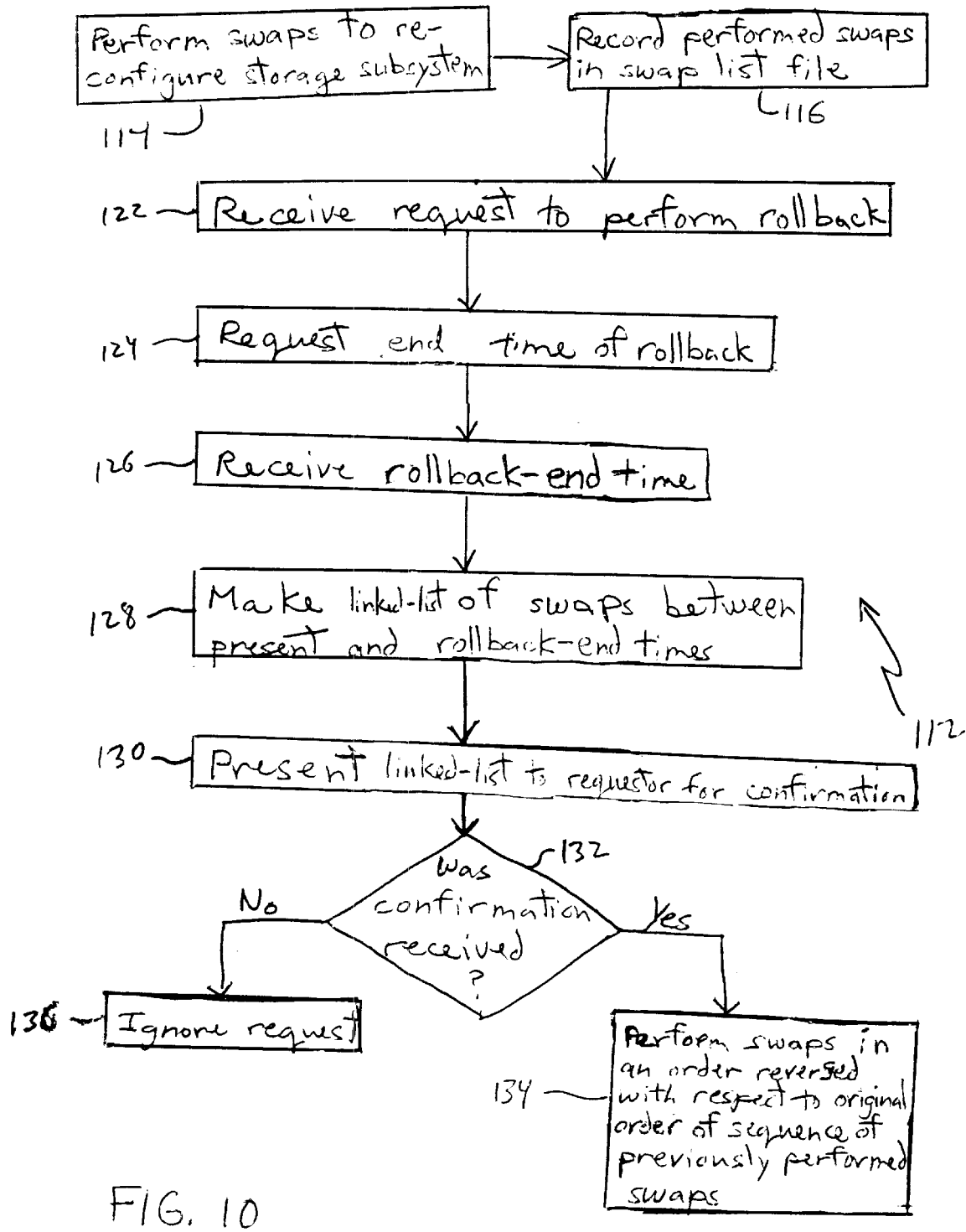
FIG. 10 is a flow chart illustrating a method of rolling back the physical storage volumes of the storage subsystem to an earlier configuration.

FIG. 10 is a flow chart for a method 112 of rolling back the configuration of the storage subsystem 10 shown in FIGS. 1A–1B. Prior to a rollback, the service processor 28 performs an ordered sequence of swaps to balance workloads of storage devices 15–17 of the data subsystem (step 114). The sequence of swaps entails one or many workload balancing cycles 55' of FIG. 5A. In response to performing a swap, the service processor 28 records information identifying the swap in a swap list file 140 (step 116). The swap list file 140 is stored in the data storage device 42 shown in FIG. 3.

A rollback is initiated when the service processor 28 receives a request for a rollback from a user or a program (step 122). In response to the request, the service processor 28 requests that the user or program to furnish an rollback-end time (step 124). The rollback-end time is the earlier time to which the rollback will return the storage subsystem 10. After the rollback, the storage subsystem will have the configuration that it had just prior to the rollback-end time, i.e., undoing swaps of physical storage volumes A–G performed after the rollback-end time. The service processor 28 receives a value for the rollback-end time from the requesting user or program (step 126).

Figure 13:
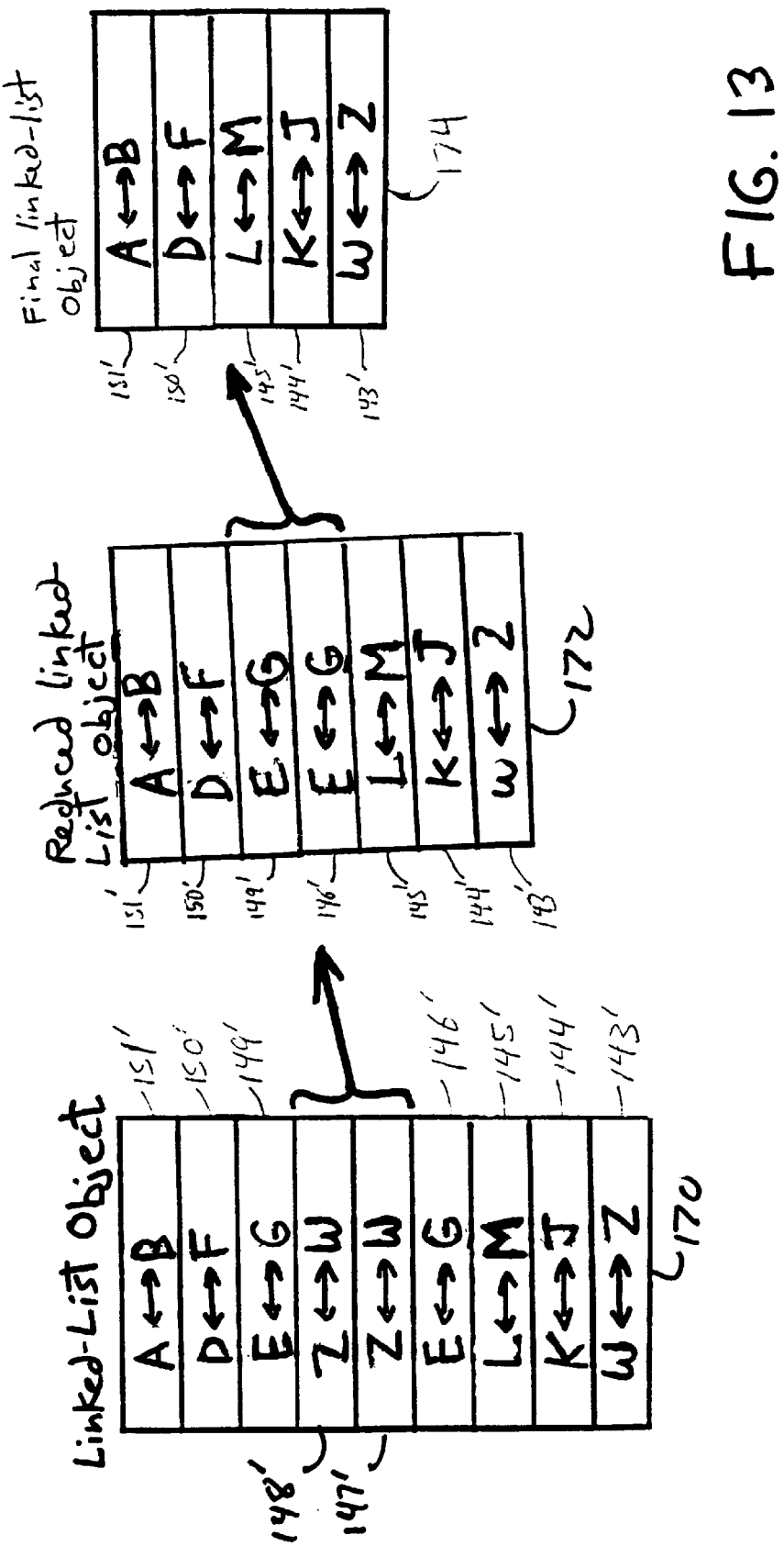
FIG. 13 illustrates a method of reducing the size of the linked-list object.

Using the rollback-end time, the service processor 28 prepares a final linked-list object, e.g., the object 174 shown in FIG. 13 (step 128). The final linked-list object lists the swaps that will be performed to return the storage subsystem 10 to its configuration just prior to the rollback-end time. The service processor 28 reads a portion of the swap list file 140 and constructs the linked-list object from the read portion. The read portion lists the swaps performed after the rollback-end time.

The final linked-list object identifies the previously performed swaps of physical storage volumes needed to perform the reconfiguration. The swaps are listed sequentially in reverse of the order in which the swaps were previously performed. The last entry of the linked-list object is the first swap performed after the roll-back end time designated by the requesting user or program.

The service processor 28 presents the final linked-list object 174 to the requesting user or program, e.g., using a graphical interface (step 130). During a preselected wait time, the service processor 28 checks regularly for a reconfirmation of the rollback request by the user (step 132). If a reconfirmation is received, the service processor 28 performs the swaps of the final linked-list object in an order that reverses the order of the original sequence in which the swaps were performed (step 134). If a reconfirmation is not received within a predetermined time, the service processor 28 ignores the original rollback request (step 136).

During the performance of a rollback, the service processor 28 of some embodiments is unavailable to process other commands. The performance of the rollback may require substantial time if many swaps of physical storage volumes need to be undone. By presenting the linked-list object 170 to the requesting user or program, the user or program can make an informed decision on whether to tie up the service processor 28 by proceeding with the rollback.

FIG. 11 shows the swap list file 140 that identifies all swaps performed by the service processor 28. The swap list file 140 has one entry 141–151 for each swap performed by the service processor 28 and has no size limit. The entries 141–151 are sequential and list the times that the swaps were performed, see column 153, and the pairs X-Y, Z-B, W-Z, K-J, L-M, E-G, Z-W, D-F, A-B of physical storage volumes swapped, see column 155. The service processor 28 updates the swap list file 140 after performing each swap of the pairs X-Y, Z-B, W-Z, K-J, L-M, E-G, Z-W, D-F, A-B of physical storage volumes.

A user can delete the entire swap list file 140 or a portion thereof. Deleting a portion of the swap list file 140 temporally limits rollbacks of the configuration of the storage subsystem 10. The service processor 28 cannot rollback the configuration of the storage subsystem 10 to times earlier than the time of the most recent deleted swap, because the final linked-list cannot be determined for earlier times. That is, swaps at earlier times are not identified on the swap list file 140 and are needed to construct the final linked-list. Thus, the swaps for returning the configuration to those earlier times at step 134 of FIG. 11 cannot be identified.

Figure 12:
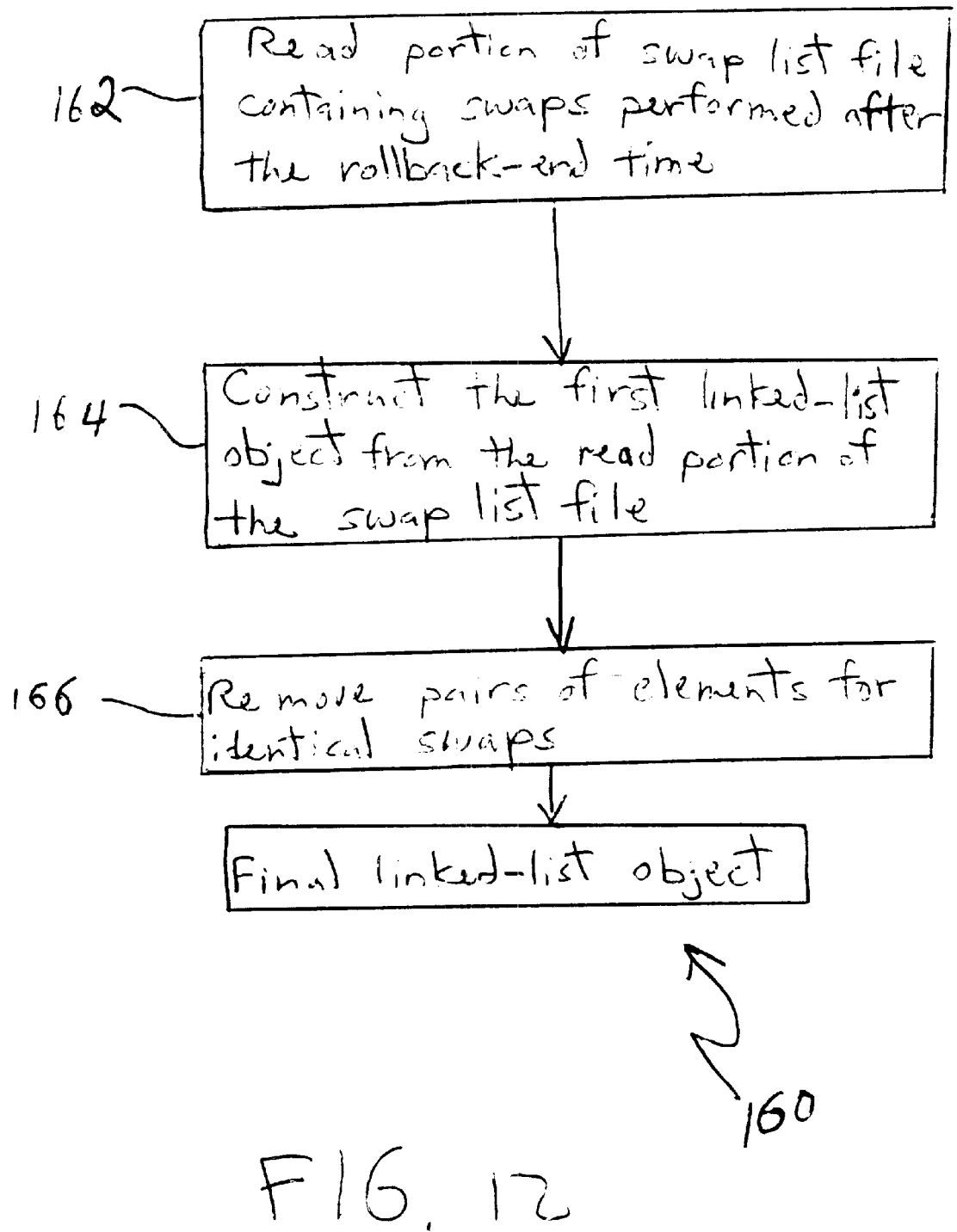
FIG. 12 illustrates a method of preparing a linked-list object identifying a portion of the previously performed swaps.

FIG. 12 illustrates a method 160 of preparing the final linked-list object at step 128 of FIG. 10. To start, the service processor 28 reads a portion of the swap list file 140 (step 162). The read portion encompasses at least those entries 143–151 of the swap list file 140 that have times later than the rollback-end time received from the requesting user or program. The rollback-end time is assumed to be between $T_2$ and $T_3$ for illustration. From the read entries 143–151, the service processor constructs a first linked-list object 170, shown in FIG. 13 (step 164).

The format of the first linked-list object 170 allows reads and deletes of single entries therein by the service processor 28. The swap list file 140 may have a format not allowing such manipulations. For example, the swap list file 140 may be a text file.

Referring to FIG. 13, the first linked-list object 170 includes one entry 143'–151' for each previously performed swap between the present and rollback-end time. Each entry 143'–151' of the linked-list object 170 identifies the pair W-Z, K-J, L-M, E-G, Z-W, Z-W, E-G, D-F, A-B of physical storage volumes that were previously swapped. The entries 143'–151' are listed in reverse chronological order with respect to the previously performed order. By performing the swaps of the linked-list object 170 in the order listed, the service processor 28 can reconfigure the storage subsystem 10 to the configuration at the rollback-end time selected by the requestor.

Referring again to FIG. 12, the service processor 28 reduces the size of the linked-list object 170 by removing pairs of elements for identical swaps (step 166). To remove elements for identical swaps, the service processor 28 performs a serial search through the linked-list object 170. The service processor 28 deletes pairs of entries that are adjacent and identical, e.g., the entries 147', 148'. Pairs of identical swaps may occur when the service processor 28 swaps two storage volumes A–G of FIG. 1A during one cycle of the swapping algorithm 51 of FIGS. 5A–5B and swaps back the volumes A–G in the next cycle.

Removing identical adjacent swaps reduces the time used to perform a rollback 10, because such pairs of swaps need not be performed to return the storage subsystem 10 to an earlier configuration. After removing all such identical and adjacent pairs, the service processor 28 produces the final linked-list object 174 used to define the series of swaps performed during the rollback.

FIG. 13 illustrates that removals of identical swaps from the linked-list object 170 may generate other pairs of swaps to remove. For example, the service processor 28 finds and removes two identical swaps 147', 148' in the linked-list object 170. The removal generates a reduced linked-list object 172 in which two identical swaps 146', 149' are made adjacent. Thus, the service processor 28 performs a second-level removal of these two newly adjacent swaps 146', 149' to produce the further, and here final, linked-list object 174.

In general, reduction of linked-list objects by removing adjacent identical swap pairs may generate more identical swap pairs at adjacent entries of the reduced linked-list objects. Thus, the reduction of a linked-list object to the final linked-list object, as illustrated by FIG. 13, may entail more iterations.

Other additions, subtractions, and modifications of the described embodiments may be apparent to one of ordinary skill in the art.

What is claimed is:

1. A method of reconfiguring a storage subsystem, comprising:
performing a first ordered sequence of reconfigurations of physical volumes of the storage subsystem; and
then, performing a portion of the reconfigurations in a second ordered sequence in response to receiving a rollback request, the order of the second sequence being reversed with respect to the order of the first sequence.

2. The method of claim 1, wherein each reconfiguration is a swap of a pair of physical storage volumes.

3. The method of claim 1, further comprising:
reading a portion of a file, the file listing the first ordered sequence of performed reconfigurations; and
wherein the reconfigurations performed in second ordered sequence are identified in the read portion of the file.

4. The method of claim 3, further comprising:
making a first list of previously performed swaps from the read portion.

5. The method of claim 4, further comprising:
forming a second list of swaps by removing pairs of identical swaps from the first list; and
wherein the performing a portion executes the swaps on the second list.

6. The method of claim 2, wherein the performing a portion reconfigures the storage subsystem to a configuration existing prior to completing the sequence of reconfigurations.

7. A method of reconfiguring a storage subsystem, comprising:
performing a series of swaps of physical storage volumes of the subsystem;
recording each swap in a list in response to performing the swap;
reading a portion of the list; and
undoing a portion of the swaps read from the list.

8. The method of claim 7, wherein the undoing reconfigures the physical storage volumes to a configuration existing prior to completing the series of swaps.

9. The method of claim 7, wherein the act of undoing includes performing the portion of the swaps in an order that is reversed with respect to the series.

10. The method of claim 7, wherein the act of undoing comprises:
creating a second list for the portion of the swaps by removing pairs of entries from the first list, each member of a pair corresponding to the same swap.

11. The method of claim 10, wherein the removed entries are adjacent entries on a list derived from the first list.

12. A data storage device storing a computer executable program of instructions for reconfiguring a storage subsystem, the instructions to cause the computer to:
perform a series of at least three swaps of physical storage volumes, the swaps having been previously performed in a reversed order.

13. The device of claim 12, the instructions to further cause the computer to:
read a portion of a file, the file listing previously performed swaps sequentially.

14. The device of claim 13, the instructions further causing the computer to:
make a list of swaps from the read portion of the file.

15. The device of claim 14, the instructions further causing the computer to:
form a second list of swaps by removing adjacent pairs of identical swaps from the first list; and
wherein the instructions to perform a series of swaps causes the computer to execute the swaps on the second list.

16. The device of claim 12, wherein the instructions to perform a series of swaps cause the computer to return the configuration of the storage subsystem to an earlier configuration.

17. A data storage device storing a computer readable object, the object comprising:
a list identifying a plurality of entries, each entry identifying a swap performed on pairs of physical storage volumes of a storage subsystem and a time at which the swap was performed, the list being sequential with respect to the times.

18. The data storage device of claim 17, wherein each pair of sequential entries of the list corresponds to swaps between different pairs of storage volumes.

19. An apparatus, comprising:
a storage subsystem having a plurality of physical storage volumes; and
a computer capable of reconfiguring the storage subsystem by performing a sequence of swaps of storage volumes and of rolling back the storage subsystem to an earlier configuration by performing a portion of the swaps in reversed order.

20. The apparatus of claim 19, wherein the computer is configured to perform the roll back in response to receiving a selected time, the portion of the swaps of the sequence being performed being limited to swaps performed after the selected time.

* * * * *